United States Patent [19]

Asano et al.

[11] 3,946,411

[45] Mar. 23, 1976

[54] FILM CASSETTE

[75] Inventors: Yoshio Asano, Nishinomiya; Kinji Ohkubo, Minami-ashigara, both of Japan

[73] Assignee: Fuji Photo Film Co., Ltd., Minami-ashigara, Japan

[22] Filed: Apr. 23, 1974

[21] Appl. No.: 463,346

[30] Foreign Application Priority Data
Apr. 23, 1973  Japan.............................. 48-45902

[52] U.S. Cl. .................................................. 354/174
[51] Int. Cl.² ........................................... G03B 19/00
[58] Field of Search ..................................... 354/174

[56] References Cited
UNITED STATES PATENTS

2,628,545   2/1953   Kurnick ............................. 354/174
3,595,661   7/1971   Gold .................................. 354/174

Primary Examiner—John M. Horan
Attorney, Agent, or Firm—Sughrue, Rothwell, Mion, Zinn & Macpeak

[57] ABSTRACT

A film cassette comprising an outer case containing monosheets therein and having a front wall defining an opening, through which said monosheets may be exposed, an end wall defining a removal passage, through which said exposed monosheets may pass, and another end wall defining an insertion passage, and a lightproof protective board, which is locatable in a foremost position in said cassette to protect said monosheets from exposure to light through said front opening, is removable from said cassette through said removal passage, and is insertable into said foremost position through said insertion passage.

5 Claims, 22 Drawing Figures

FILM CASSETTE

The present invention relates to a film cassette, and more particularly to an improved reloadable film cassette.

A comparative recent advance in photographic art has been provision of a type of film each unit of which comprises a combination of a negative film portion and a positive film portion associated with a sac containing a solution of photographic processing chemicals, and which, when employed in association with a special type of camera, makes it possible to obtain a positive image of an object on the positive film portion immediately after the negative film portion has been exposed to light reflected from the object. Such film goes under a variety of popular or trade names, such as instant-print film, film-sheet, monosheet, or similar appellations. Similarly, a camera associated with this type of film may be called, for example, an auto-copy or an auto-process camera. For the purposes of the present description this type of film, and a camera associated therewith will be referred to respectively as monosheet, and auto-process camera.

Monosheets are conventionally provided in a cassette (or cartridge) which is loadable in an auto-process camera. Whereas many advances have been made relative to monosheets themselves, by the provision of monosheets having improved qualities, or different speeds, or sensitivities, progress relative to cassettes for containing monosheets have been relatively slight. A main disadvantage of conventional monosheet cassettes is that the cassettes are not reloadable, that is, if a cassette is removed from a camera when there are still monosheets remaining in the cassette, these monosheets are exposed, or partially exposed to light, and therefore rendered unuseable. Because of this, if, after initial loading of a cassette containing monosheets having a certain sensitivity into an autoprocess camera, a photographer wishes to photograph a scene or object requiring monosheets having a different sinsitivity, or other characterisitcs, and there are still monosheets remaining in the loaded cassette he or she must either waste the remaining monosheets, by loading a new cassette, or renounce taking the required shots. A photographer is faced with a similar problem when there are only 2 – 3 unexposed monosheets left in a cassette loaded in a camera, and he or she wishes to take 6 – 8 shots in rapid succession. In this case also, the photographer must either reload a new, full cassette, and thereby waste the remaining 2 – 3 monosheets, or renounce taking the required number of shots. Conventional cassettes also have the disadvantages that they are generally of complex construction, that removal of a cassette from an auto-process camera may cause damage to camera mechanisms provided for removal of exposed monohseets, particularly if the cassette is removed before all the monosheets therein have been used, and that means provided for forwarding monosheets in a cassette generally apply pressure centrally on the monosheets, whereby there may be distortion of monosheets in the cassette. Another disadvantage associated with conventional cassette is that the front of a cassette usually comprises an open portion, which is covered by a sheet, or similar means, for protection of monosheets from exposure to light prior to loading of a cassette into a camera, this protective means generally being weak compared with the main body of a cassette, and monosheets can be damaged by a photographer inadvertently pressing the protective means.

It is accordingly an object of the present invention to provide an improved monosheet cassette.

It is another object of the invention to provide a monosheet cassette that may be loaded or unloaded into or from an auto-process camera any number of times without detriment to remnant monosheets in the cassette.

It is another object of the invention to provide a monosheet cassette having a sturdy, but light and compact, means for protection of monosheets from exposure to light prior to loading of the cassette into a camera, or during temporary unloading therefrom.

It is a further object of the invention to provide a monosheet cassette from which monosheets are easily removeable by a simple mechanism provided in an autoprocess camera, whereby there is no risk of jamming or breakage of parts during removal of the cassette from a camera.

It is a still further object of the invention to provide a monosheet cassette which is simple, compact, and economical in construction.

In accomplishing these and other objects, there is provided, according to the present invention, a monosheet cassett comprising a rigid outer case, an inner frame, and a protective board, both the outer case and the inner frame having matching open front portions through which monosheets may be exposed, and small hole portions through which a camera mechanism for removal of monosheets may act, and the frame being contained in the outer case. Monosheets in the cassette are contained inside the frame, and are urged towards the front of the frame and the front of the outer case by a spring plate, which is mounted on the inside of the rear wall of the outer case, and applies even pressure, both on the monosheets, and, acting through the monosheets, on the inner frame. The protective board is provided between the front of the inner frame and the front wall of the outer case. When the cassette is loaded in an auto-process camera, the protective board is removed by a camera mechanism for removal of monosheets, whereupon the monosheets in the cassette and the inner frame are moved forwards to the front wall of the outer case, thereafter successive monosheets being removed by the monosheet removal mechanism after exposure thereof, the inner frame remaining in the same position. If it is required to remove the cassette before all the monosheets of the cassette have been exposed, the protective board may be re-inserted into the cassette through an insertion passage formed on the opposite side of the cassette to the passage for removal of monosheets and the board, whereby the cassette may be removed, and the remaining monosheets are protected from light, and may be used on subsequent reloading of the cassette. The invention also presents the advantage that procedure for manufacture of conventional cassettes may be easily adopted to manufacture of a cassette of the invention.

A better understanding of the present invention may be had from the following full description, when read in conjunction with the attached drawings, in which.

Figures 1, 2, 3:
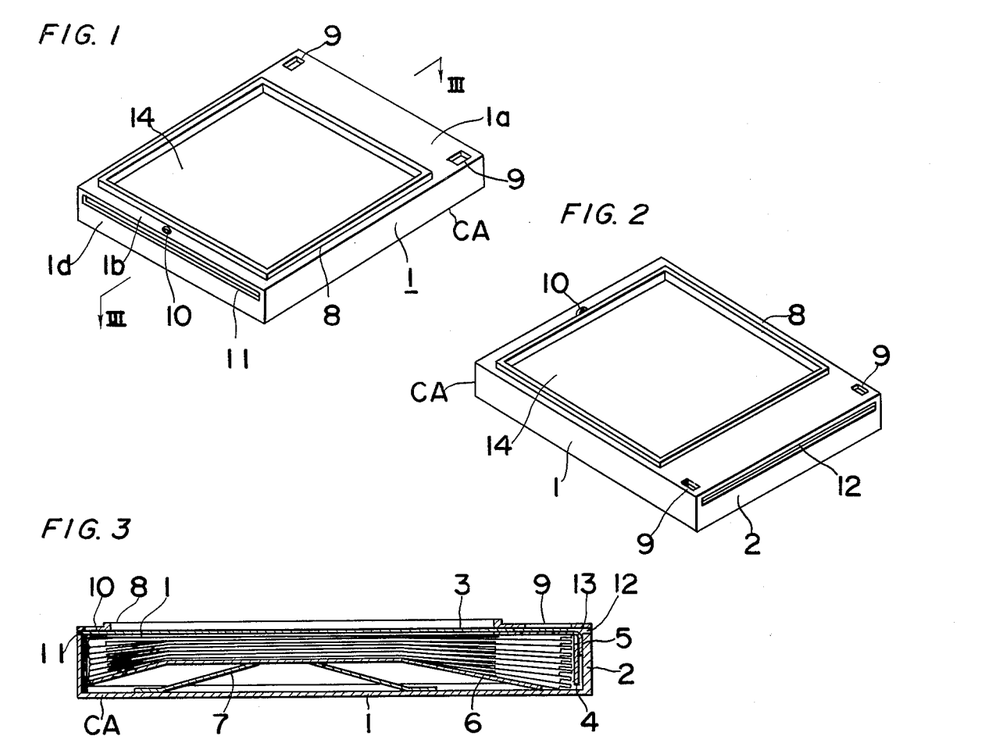
FIGS. 1, 2 are perspective views of a film cassette according to a first embodiment of the present invention.
FIG. 3 is a cross-sectional view taken along the line III — III of FIG. 1.

Referring to FIGS. 1 and 2, there is shown the outer case 1 of a cassette CA for containing monosheets 6. The outer case 1 is made of a suitable rigid, lightproof material, such as thermosetting plastic, metal sheet, or thick cardboard, and the rear and side walls thereof are solid. The leading end of the case 1, that is, the end through which exposed monosheets 6 are removed, is fitted with a detachable end wall 2. A monosheet removal slit 12 is formed between the front edge of the end wall 2 and the case front wall. In the opposite end wall 1d there is formed a slit 11, which is in line with the slit 12, and is for re-insertion of a protective board 3, as described below. In the front wall of the case 1 there is formed a large opening 14, which has dimensions equal to those of the negative film portion of a monosheet 6, and through which a foremost monosheet 6 in the cassette CA may be exposed. The case front wall further comprises a broad leading end portion 1a and a narrower rear end portion 1b, on opposite sides of the exposure opening 14. In the leading end portion 1a there are formed two small, gnerally rectangular openings 9, which are well spaced from one another, and which permit entry of a camera mechanism for removing the protective board 3 or monosheets 6 from the cassette CA. In approximately the center of the rear end portion 1b there is formed a small hole 10, through which a means provided in a camera may pass, to facilitate re-insertion of the protective board 3, as described below.

Referring now to FIG. 3, the cassette CA further comprises an inner frame 4, which is made of rigid material, such as aluminium sheet, fits into the outer case 1, and which comprises an open rear portion, and a large front opening and small front openings corresponding to the exposure opening 14 and small openings 9 of the outer case 1. In the leading end wall of the inner frame 4 there is formed a slit 13, a corresponding to the monosheet removal slit 12 of the case 1. Monosheets 6 in the cassette CA lie within the frame 4, the negative film portions thereof being in line with the large front opening of the frame 4 and exposure opening 14 of the case 1, the leading end portions thereof, that is, the portions thereof carrying sacs containing processing solution, being in line with the broad leading end portion 1a of the outer case 1, and the foremost monosheet 6 being pressed against the front wall of the frame 4 and lying in line with the slit 13. The monosheets 6 are urged towards the front of the cassette CA by a spring plate 7 which is mounted on the inner side of the rear wall of the outer case 1, and which contacts the rearmost monosheet 6. The spring plate 7 being large, pressure applied on the monosheets 6 is even. The foremost monosheet 6 being in contact with the rear of the front wall of the inner frame 4, the frame 4 also is urged forwards by the force of the spring plate 7.

Prior to loading of the cassette CA in an autoprocess camera C, the monosheets 6 are protected from exposure to light by a protective board 3, which is made of stiff paper, plastic, or other suitable lightproof material, has large dimensions generally equal to those of the front wall of the outer case 1, and is located between the front walls of the frame 4 and case 1. Being contacted by the front wall of the frame 4, the board 3 is held in firm contact with the front wall of the case 1 due to the forwards-acting force of the spring plate 7. The board 3 may be removed from the cassette CA through the removal slit 12 of the outer case 1, thereby permitting entry of light through the exposure opening 14, and front opening of the frame 4, and permitting exposure of a foremost monosheet 6 in the cassette CA. To again prevent exposure of monosheets 6, the board 3 may be re-inserted into the cassette CA through the slit 11 in the rear end wall of the case 1.

Still referring to FIG. 3, the monosheet removal slit 13 of the inner frame 4 is covered by a strip 5, which is made of a suitable material, such as metal foil, that is lightproof, flexible, and possesses elasticity, and one edge of which is affixed to the outer side of the leading end wall of the frame 4. The strip 5 is equal to, or slightly greater in length than the slit 13. The width of the strip 5 is greater than the distance between the outer case front wall and the line of attachment of the strip 5 to the frame end wall. Prior to loading of the cassette CA into the camera C, the forward end of the strip 5 is curved inwards with respect to the cassette CA, and is held between the front wall of the frame 4 and the board 3. Upon removal of the board 3 from the cassette CA, the board 3 pushes the forward end of the strip 5 outwards with respect to the cassette CA. After complete removal of the board 3, the strip 5 remains curved outwardly with respect to the cassette CA, and the forward end thereof is flexed against the rear of the front wall of the outer case 1, whereby the strip 5 normally prevents entry of light through the slit 13, but monosheets 6 may easily push the strip 5 slightly to the rear, and be removed from the cassette CA, through the slits 13, 12.

Figure 4:
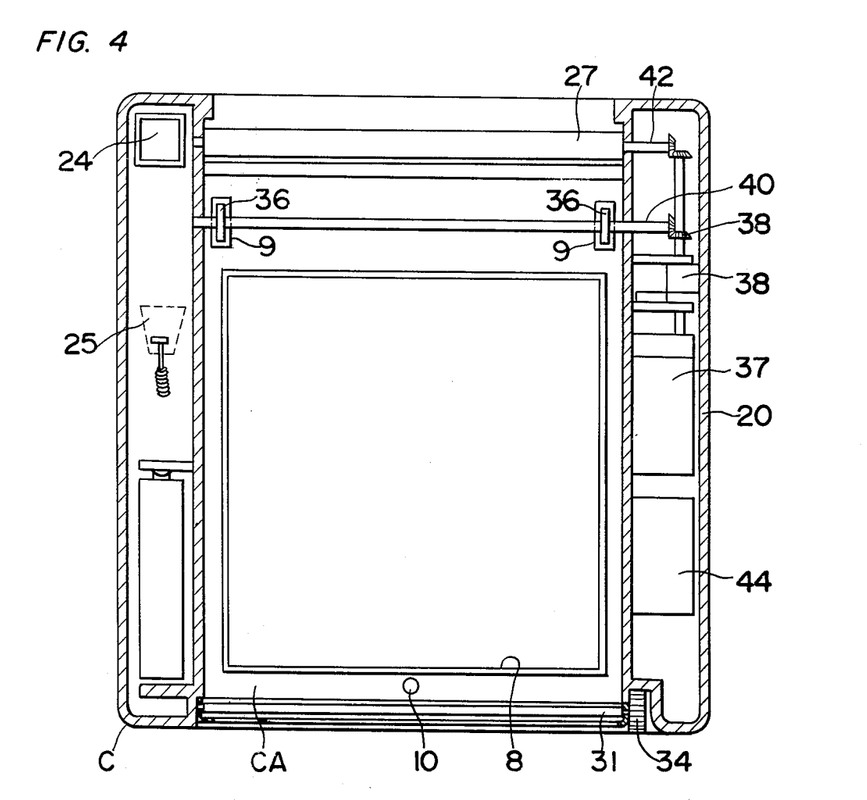
FIG. 4 is a front cross-sectional view showing the film cassette of FIG. 1 loaded in a camera.
Figure 5:
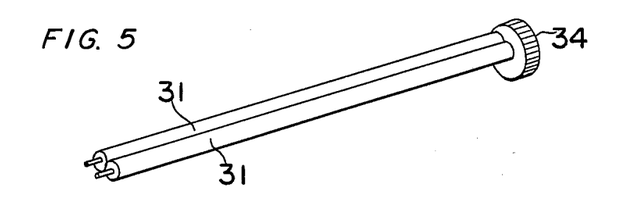
FIG. 5 is a detail view of feed rollers shown in FIG. 4.
Figure 6:
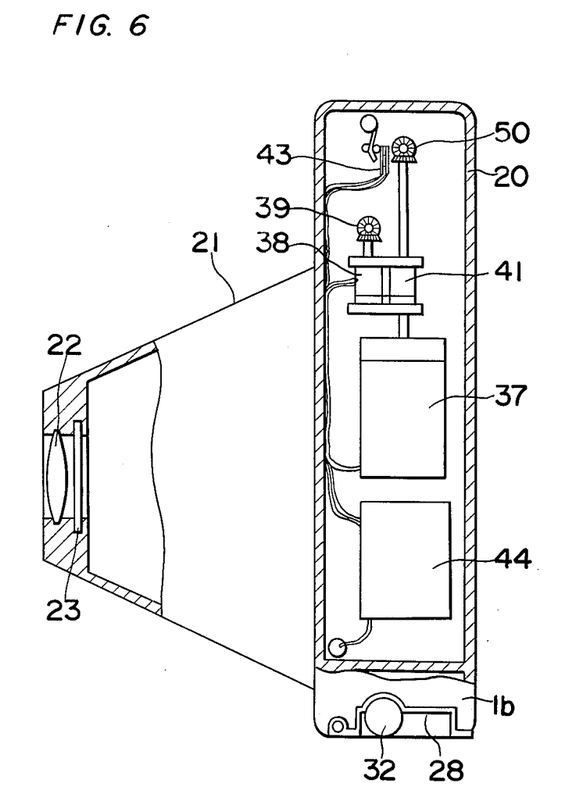
FIG. 6 is a side view partially in section, of the camera of FIG. 4.

FIGS. 4 through 7 show an auto-process camera C in association with which the cassette CA may be used. The camera C comprises a main body portion 20, in which there is provided a view finder 24 and a shutter button 25 (FIG. 4), and from the front of which projects a lens mount portion 21 carrying a lens 22 and a shutter 23 (FIG. 6).

Figure 7:
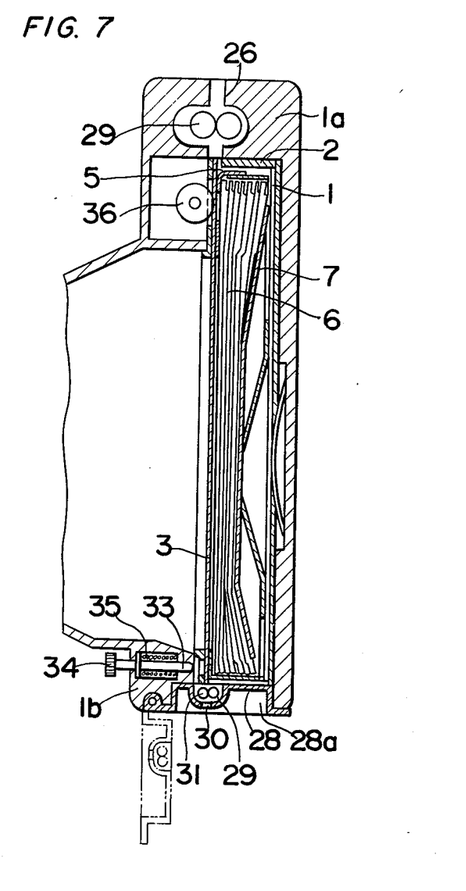
FIG. 7 is a partial vertical cross-sectional view of the camera and cassette shown in FIG. 4.

As shown most clearly in FIG. 7, in the upper portion of the main portion 20 there is formed an extraction outlet 26, with which the removal slit 12 of the cassette CA comes into line when the cassette CA is loaded in the camera C, the cassette CA being loaded with the leading end thereof uppermost. A pair of processing rolls 27 for withdrawal of monosheets 6 and simultaneous extrusion of processing solution for development of images thereon is provided in the extraction outlet 26. Friction rollers 36 provided in the camera upper portion extend into the small front openings 9 in the leading end portion 1a of the front wall of the cassette outer case 1, and contact the front of the protective board 3. The hole 10 in the other, lower end portion of the front wall of the cassette outer case 1 is in line with a push rod 33 provided in the camera lower portion. The push rod 33 is slidably mounted in the camera lower portion, and lies on a front-to-rear line relative to the camera C, one end of the push rod 33 being adjacent to the cassette outer case hole 10, and the other end thereof being exterior to the front of the camera lower portion. A knob 34 is mounted on the outer end of the rod 33. An expansion spring 35 is mounted on the rod 33, and exerts a constant pressure to keep the rod 33 out of contact with the cassette CA. The rod 33 may, however, be moved inwards with respect to the camera lower portion, in opposition to the force of the spring 35, by rearwards pressure applied on the knob 34, in which case the rod 33 extends into and through the hole 10 in the cassette front wall.

At the bottom of the camera main portion 20, there is formed a cassette loading inlet 28a, which is normally sealed by a cover 28. The cover 28 is pivotally mounted on one side, and may be swung open to the position indicated by the chain-dot line portion of FIG. 7, to permit the cassette CA to be loaded upwards into the camera C. The cover 28 comprises a recessed portion 29, which accommodates a pair of feed rolls 31, and in which there is formed an inlet slit 30 communicating with the exterior of the camera C. When the cover 28 is closed, as indicated in the solid line portion of FIG. 7, the inlet slit 30 of the camera C lies in line with the reinsertion slit 11 of the loaded cassette CA. As indicated in FIGS. 4 and 5, the feed rolls 31 are in connection with, and may be rotated by an actuation knob 32, which is accommodated in a recessed portion of the camera lower portion for insertion of the board 3 as described later and for normally preventing entry of light through the slit 30, and is exterior to the camera C, whereby a photographer may contact and rotate the actuation knob 32, to rotate the feed rolls 31.

In FIGS. 4 and 6, a motor 37 provided in the camera main portion 20 acts through a clutch 38, bevel gear train 39, and transmission shaft 40 to drive the friction rollers 36, and through a clutch 41, bevel gear train 50, and transmission shaft 42 to drive the processing rolls 27. Actuation of the motor 37 and clutches 38, 39 is effected by a control box 44, which initially actuates the motor 37 upon actuation of the shutter button 25, and which cuts drive through the clutches 38, 39 and stops actuation of the motor 37 at suitable times, in response to signals received from contacts 43a, 43b, which are situated adjacent to the processing rolls 27, and are actuated upon passage of a monosheet 6 through the rolls 27.

Figure 8:
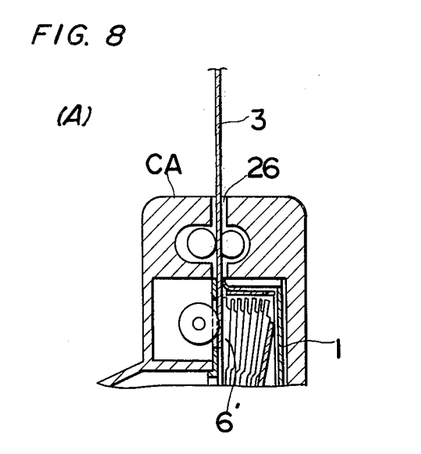
FIG. 8(A) – (E) shows sequential operation of the film cassette of FIG. 1, FIG. 9, shows a partial cross sectional view of second embodiment of the film cassette according to the present invention, A

Reference is now had to FIG. 8, which illustrates the action of removal of the protective board 3, or of an exposed monosheet 6', from the loaded cassette CA, and of re-insertion of the board 3 thereinto.

After initial loading of the cassette CA into the camera C, a blank shot is taken, for example by depression of the shutter button 25 while a cover is maintained over the lens 22. Hereupon, the motor 37 supplies drive to the friction rollers 36 and the processing rollers 27. Due to the contact between the friction rollers 36 and the protective board 3, the rollers 36 push the board 3 out of the cassette CA, through the slit 12, into the camera extraction outlet 26 and up to the rolls 27, which continue to draw the board 3 upwards through the outlet 26 and to the exterior of the camera C, as shown in FIG. 8(A). Passage of the board 3 through the rolls 27 causes actuation of the contacts 43 (FIG. 6). Actuation of the contact 43 results in a signal supplied to the control box 44, which immediately disengages the clutch 38, whereby drive to the friction rollers 36 is cut, and subsequent withdrawal of the board 3 is effected by the rolls 27 only. Actuation of the contacts 43 results in a signal to a delay circuit in the control box 44, which, after the elapse of sufficient time for the board 3 to have been completely extruded from the camera C, disengages the clutch 39 and simultaneously stops drive of the motor 37. After complete removal of the board 3 from the cassette CA, the spring plate 7 pushes the monosheets 6 and inner frame 4 forwards into a position in which the front wall of the inner frame 4 is pressed firmly against the front wall of the outer case 1, and the slit 13 in the leading end wall of the frame 4 is in line with the monosheet removal slit 12 of the outer case 1, the foremost monosheet 6' now being in line with the slits 12, 13, contacted by the rollers 36, and also exposable through the cassette exposure opening 14 to light directed into the camera C by the lens 22. Upon exposure of the foremost monosheet 6', by actuation of the shutter button 25, the monosheet 6' is extracted from the cassette CA and camera C by the friction rollers 36 and processing rolls 27 in the same manner as the board 3, as illustrated in FIG. 8(B). As the monosheet 6' is drawn through the rolls 27, processing solution contained in a sac associated therewith is extruded, to effect development of a positive image thereon in a known manner. After removal of the monosheet 6' from the cassette CA, the remaining monosheets 6 are moved forwards by the spring plate 7, whereby the next foremost monosheet 6 is brought into a position for exposure and subsequent removal through the slits 13, 12. The frame 4 is not, of course, moved, since it is already pressed against the front wall of the case 1. It is to be noted that, since drive to the friction rollers 36 is cut immediately an exposed monosheet 6 is engaged between the press rolls 27, only one monosheet 6 at a time is removed.

If it is required to temporarily unload the cassette CA before all the monosheets 6 provided therein have been used, protection of the remaining monosheets 6 may be ensured by re-insertion of the board 3 into the cassette CA, as illustrated in FIG. 8(C), FIG. 8(D).

In FIG. 8(C), first the knob 34 is pressed inwards, with respect to the camera C. This causes the push rod 33 to move rearwards through the hole 10 in the front wall portion 1b of the cassette outer case 1, to contact the front side of the lower portion of the inner frame 5 front wall, and push the lower portions of the frame 4 and monosheets 6 slightly rearwards. The protective board 3 is introduced through the inlet slit 30, in the cover 28 of the cassette loading inlet 28a of the camera C, between the feed rolls 31, and through the slit 11 of the cassette CA, to bring the leading end thereof between the lower ends of the front walls of the outer case 1 and inner frame 4. Pressure on the knob 34 is now released, whereupon the spring 35 returns the push rod 33 to a forward position, out of contact with the cassette CA, and the cassette plate spring 7 pushes the frame 4 forwards to grip the board 3, as indicated in FIG. 8(D). Next, the actuation knob 32 (FIG. 4) is rotated manually to cause the feed rolls 31 to rotate and draw the board 3 completely into the cassette CA, into the configuration shown in FIG. 8(E). The protective board 3 is now in its original position, and the cover 28 may be opened, and the cassette CA be unloaded, without risk of exposure of the remaining monosheets 6, which are therefore available for subsequent use.

The invention thus makes it possible to unload and reload a film cassette any number of times, without detriment to monosheets contained therein. Other advantages of the cassette are simplicity and sturdiness of construction, the fact that forwards pressure is applied evenly on monosheets by a spring plate provided in the cassette, which also means that an associated auto-process camera need not be provided with a forwarding spring means, and so may be more compact in construction. Another important advantage of the cassette of the invention is that connection between the cassette and a camera means for removal of a protective board or exposed monosheets is extremely simple, and so there is no risk of jamming or of breakage of camera parts upon loading or unloading of the cassette into or from a camera.

Figure 9:
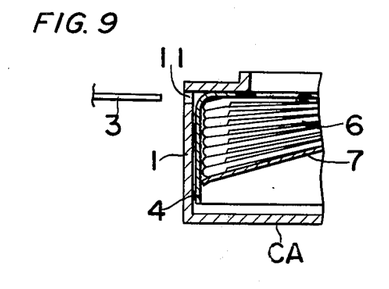
Figure 10:
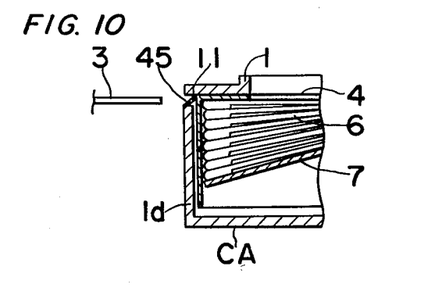
FIG. 10 shows a partial cross sectional view of a third embodiment of the film cassette according to the present invention.

It is evident that the abovedescribed film cassette may be modified in various ways without any departure from the principles of the invention. For example, in another embodiment of the invention shown in FIG. 9, a hole 10 is not provided in the front wall portion 1b of the outer case 1, and the corner of the inner frame 4 adjacent to the inlet slit 11 is rounded, whereby, upon re-insertion of the protective board 3, the board 3 may easily push past this corner of the frame 4, and be inserted between the frame 4 and case 1 front walls. In another embodiment of the invention shown in FIG. 10, a hole 10 is not formed in the outer case front wall, and the cassette CA is provided with a small spring plate 45, one edge of which is fixedly attached to the outer side of the case end wall 1d, in the vicinity of the inlet slit 11, which extends through the slit 11, and the front edge of which is normally flexed against the front wall of the outer case 1, and may be moved rearwards to contact the front side of the inner frame front wall. In this embodiment, when the protective board 3 is re-inserted into the cassette CA, the leading end of the board 3 pushes the forward portion of the spring plate 45 rearwards, and the plate 45 pushes the end portion of the frame 4 rearwards. The spring plate 45 thus effects the same function as the push rod 33 described in reference to the 1st embodiment, and the board 3 may be inserted smoothly into the cassette CA. In an auto-process camera associated with the embodiments of FIGS. 9, 10, a push rod 33 and associated elements need not, of course, be provided.

Figure 11:
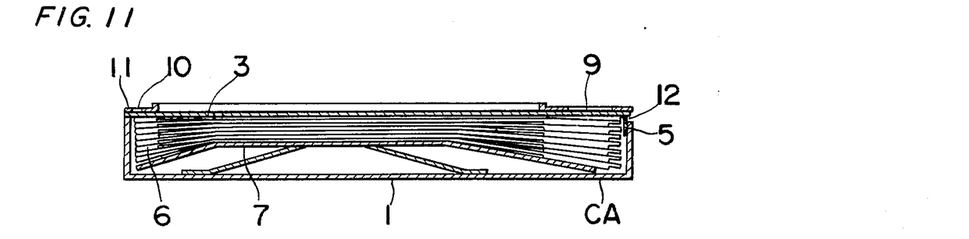
FIG. 11 shows a cross sectional view of a fourth embodiment of the film cassette according to the present invention.

In another embodiment shown in FIG. 11, the inner frame 4 is dispensed with. In this cassette, the protective board 3 is inserted directly between the foremost monosheet 6 and the front wall of the outer case 1. Also, when it is required to re-insert the board 3, the push rod 33 is brought into direct contact with the foremost monosheet 6, to move the lower end portions of the monosheets 6 rearwards, and permit smooth insertion of the board 3.

Figure 12:
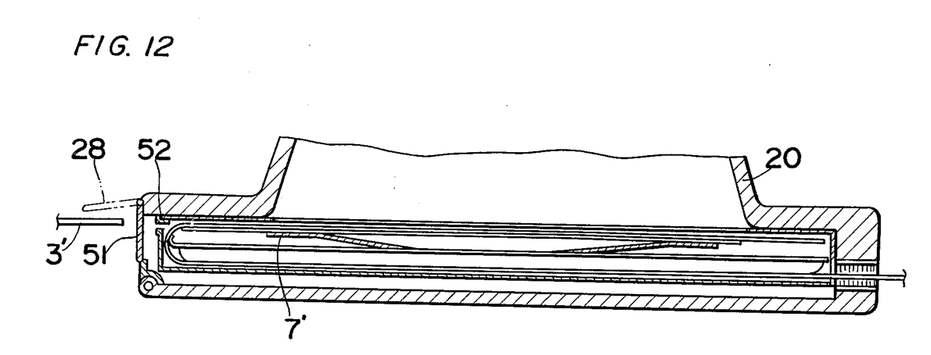
FIG. 12 is a partial cross-sectional view of a fifth embodiment of the invention.
Figure 13:
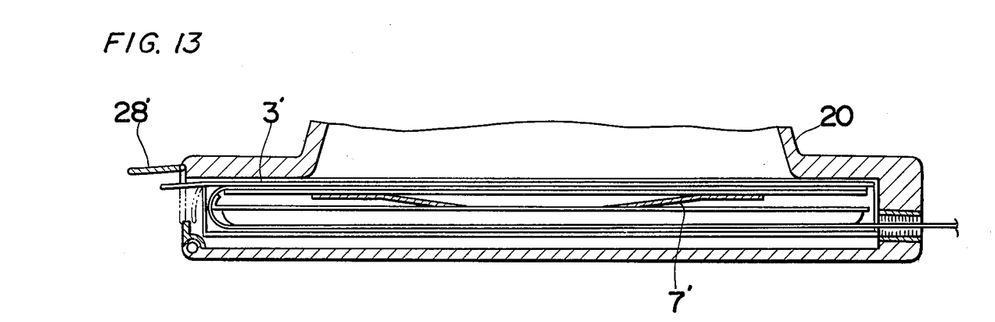
FIG. 13 is a cross-sectional view showing insertion of a protective board in the embodiment shown in FIG. 12.
Figure 14:
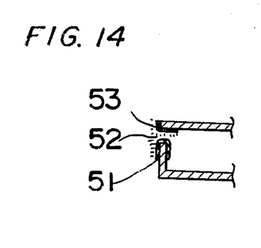
FIG. 14 is an enlarged view showing the protective board inlet slit of the embodiment of FIG. 12.
Figure 15:
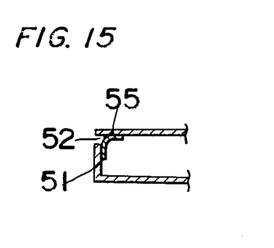
FIG. 15 shows a partial cross sectional view of a first variation of the inlet slit of the embodiment of FIG. 12, are modifications of the slit shown in FIG. 14
Figure 16:
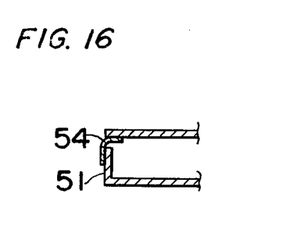
FIG. 16 shows a partial cross sectional view of a second variation of the inlet slit of the embodiment of FIG. 12.

As noted earlier, the invention offers a further advantage in that conventional film packs, containing continuously attached monosheets, may be easily converted and rendered reloadable. For example, as shown in FIGS. 12, 13, in a film pack, from which successive exposed monosheets are removed through a slit formed near the rear edge of the leading end wall of the pack, a reinsertion slit 52 may be provided in line with the foremost portion of the pack, near the front edge of the opposite end wall 51, and a board 3' may be inserted through the slit 52, if it is required to unload the pack from a camera while there are still monosheets remaining in the pack. Exclusion of light through the slit 52 can be ensured by, for example, the provision of a pile surface 53 at the front edge of the end wall 51, and at the rear portion of the front wall of the pack in the vicinity of the slit 52, as illustrated in FIG. 14. Alternatively, there may be provided a lightproof strip of metal foil 54, which is affixed at one edge the inner or outer side of the end wall 51, is curved inwards and presses against the front wall of the pack, as shown in FIGS. 15, 16. In this case, the foil 54 normally seals the slit 52, but may be easily moved to permit insertion of the board 3'.

Figure 17:
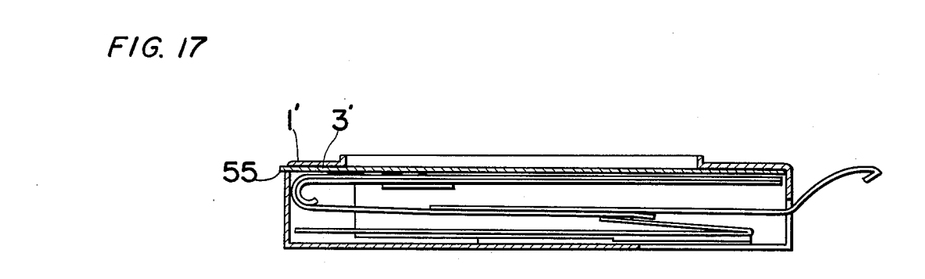
FIG. 17 shows a cross-sectional view of a sixth embodiment modifications of the film cassette of FIG. 12.
Figure 18:
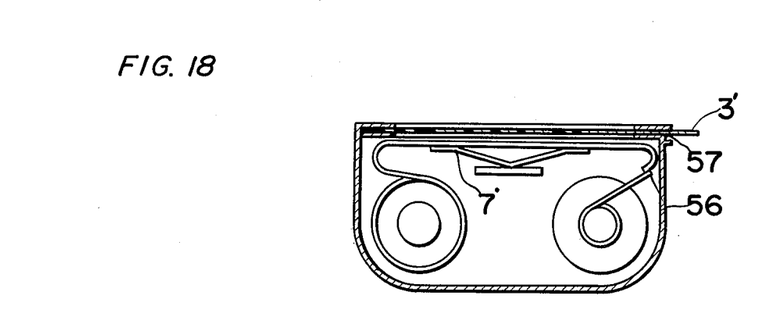
FIG. 18 shows a cross-sectional view of a seventh embodiment of the film cassette according to the present invention, Before the description of the present invention proceeds, it is to be noted that like parts are designated by like reference numerals througout the several views of the accompanying drawings.

In a conventional film pack such as that shown in FIG. 17, in which monosheets are contained in continuous attachment, and successive exposed monosheets are detached, and them removed, there may be provided an inlet slit 55 which is formed near the front edge of one end wall of the pack, and in line with a foremost position in the pack, and through which a protective board 3' may be inserted when it is required to temporarily unload the pack from a camera. As shown in FIG. 18, a film pack of the type generally known as a Brony film pack also, that is, in a film pack in which monosheets are provided in continuous attachment, and exposed monosheets, although immediately processed, are not immediately extruded, but are wound up and kept in the pack until the pack is unloaded from a camera, there may be provided a slit 57 near the forward end of one side of the wall 56 of the pack, and a board 3' may be inserted into the pack, through the slit 57 to protect unexposed monosheet frames during temporary unloading of the pack from a camera.

As is clear from the above description, the present invention provides a simply constructed film cassette which permits reloading and thereby avoids wastage of monosheets and presents considerable advantages of economy and convenience of action in the practice of photography.

Although the present invention has been fully described by way of the preferred embodiments thereof with reference to the accompanying drawings, it is to be noted that various changes and modifications are apparent to those skilled in the art. Therefore, unless otherwise such changes and modifications depart from the true scope of the present invention, they should be construed as included therein.

What is claimed is:

1. A film cassette containing a plurality of film monosheets comprising a lightproof case, said case having a front wall having an opening therethrough through which said film monosheets may be exposed, a first end wall having a removal passage therethrough, through which exposed film monosheets may pass, a first adjustable lightproof means provided to normally close said removal passage, a second end wall having an insertion passage therethrough, a second adjustable lightproof means provided to normally close said insertion passage, means for urging film monosheets toward said front wall of said cassette, and a lightproof protective board, which is locatable between the forwardmost film monosheet and said front wall of said cassette to protect said film monosheets from exposure to light through said opening through said front wall, said lightproof board being removable from said cassette through said, first end wall opening and insertable into said forwardmost position in said cassette through said opening in said second end wall.

2. A film cassette as defined in claim 1, wherein said first lightproof means comprises a strip of flexible lightproof material with a length equal to that of said opening through said first end and a width greater than that of said, opening through said first end, one edge of said strip being attached to said case, and the free other end covers said case passage and is bent by pushing of said lightproof board to open said opening through said first end.

3. A film cassette as defined in claim 1, wherein said front wall of said case further is provided with a plurality of holes through which a camera mechanism for removal of said film monosheets and for removal or insertion of said lightproof board engages said monosheets or said lightproof board.

4. A film cassette containing a plurality of film monosheets comprising a lightproof outer case, an inner frame contained in said case, film monosheets held in contact with said frame, said outer case and said frame each having a front wall having an opening therethrough, through which film monosheets may be exposed, a first end wall having a removal passage therethrough, through which film monosheets may pass, a second end wall having an insertion passage therethrough, a pressure means for urging said film monosheets towards said front wall of said cassette, and a lightproof protective board, which is locatable between said case and said frame to protect said film monosheets from exposure to light through said opening through said front wall, said lightproof board being removable from said cassette through said removal passage, and insertable between said case and frame through said insertion passage.

5. A film cassette as defined in claim 4, wherein a lightproof means is provided to close or to open said removal passage of said case and frame, and said pressure means urges said frame towards said front wall of said case so as to close or to open said insertable passage of said case.

* * * * *